US012777187B2

(12) United States Patent
Naser et al.

(10) Patent No.: US 12,777,187 B2
(45) Date of Patent: Oct. 27, 2026

(54) TRANSFORM CODING FOR INTER-PREDICTED VIDEO DATA

(71) Applicant: InterDigital CE Patent Holdings, SAS, Paris (FR)

(72) Inventors: Karam Naser, Cesson-Sevigne (FR); Fabrice Le Leannec, Betton (FR); Franck Galpin, Thorigne-Fouillard (FR); Tangi Poirier, Thorigné-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 493 days.

(21) Appl. No.: 17/789,251

(22) PCT Filed: Dec. 24, 2020

(86) PCT No.: PCT/EP2020/087881
§ 371 (c)(1),
(2) Date: Jun. 27, 2022

(87) PCT Pub. No.: WO2021/130374
PCT Pub. Date: Jul. 1, 2021

(65) Prior Publication Data

US 2022/0394298 A1 Dec. 8, 2022

(30) Foreign Application Priority Data

Dec. 27, 2019 (EP) .................................... 19306778

(51) Int. Cl.
*H04N 19/61* (2014.01)
*H04N 19/105* (2014.01)
(Continued)

(52) U.S. Cl.
CPC ........... *H04N 19/61* (2014.11); *H04N 19/105* (2014.11); *H04N 19/109* (2014.11); *H04N 19/12* (2014.11);
(Continued)

(58) Field of Classification Search
CPC .... H04N 19/176; H04N 19/70; H04N 19/105; H04N 19/159; H04N 19/52;
(Continued)

(56) References Cited

U.S. PATENT DOCUMENTS 10,306,240 B2 5/2019 Xiu et al.
10,390,044 B2 8/2019 Karczewicz et al.
(Continued)

FOREIGN PATENT DOCUMENTS

CN 102986215 A 3/2013
CN 102986216 A 3/2013
(Continued)

OTHER PUBLICATIONS

Bross et al., "Versatile Video Coding (Draft 7)", JVET-P2001-V9, Editors, Joint Video Experts Team (JVET) of ITU-T SG 16 WP 3 and ISO/IEC JTC 1/SC 29/WG 11, 16th Meeting: Geneva, CH, Oct. 1-11, 2019, 491 pages.
(Continued)

*Primary Examiner* — Farhan Mahmud
(74) *Attorney, Agent, or Firm* — Condo Roccia Koptiw LLP

(57) ABSTRACT

Some operations associated with transform decoding may provide coding gains for intra-predicted coding blocks but not for coding blocks predicted using certain inter-prediction tools or techniques. These operations may include, for example, multiple transform selection (MTS) and/or transform skip, and the inter-prediction tools or techniques may include one or more of affine motion compensation, com-
(Continued)

bined inter and intra prediction (CIIP), a triangular partition mode (TPM), or a geometric merge mode (GEO). Thus, systems, methods, and instrumentalities associated with versatile video coding may be configured such that the aforementioned operations associated with transform decoding may be disabled for coding blocks that are predicted using one or more the inter-prediction tools or techniques described herein. Many benefits may be derived from disabling these operations including, for example, reduction of encoding time and/or signaling overhead.

13 Claims, 9 Drawing Sheets

(51) Int. Cl.
*H04N 19/109* (2014.01)
*H04N 19/12* (2014.01)
*H04N 19/147* (2014.01)
*H04N 19/176* (2014.01)
*H04N 19/625* (2014.01)

(52) U.S. Cl.
CPC ......... *H04N 19/147* (2014.11); *H04N 19/176* (2014.11); *H04N 19/625* (2014.11)

(58) Field of Classification Search
CPC ...... H04N 19/593; H04N 19/46; H04N 19/44; H04N 19/117; H04N 19/463; H04N 19/80; H04N 19/625; H04N 19/146; H04N 19/154
See application file for complete search history.

(56) References Cited

U.S. PATENT DOCUMENTS 11,082,693 B2 8/2021 Zhang et al.
11,470,354 B2 10/2022 Zhao et al.
2012/0008675 A1 1/2012 Karczewicz et al.
2016/0044314 A1 2/2016 Rinaldi
2016/0227253 A1 8/2016 Sato
2018/0167612 A1 6/2018 Lee et al.
2019/0045182 A1 2/2019 Mahdi et al.
2020/0296421 A1 9/2020 Zhao et al.
2021/0076038 A1 3/2021 Zhang et al.
2021/0076043 A1* 3/2021 Zhang .................... H04N 19/70
2021/0243475 A1* 8/2021 Tsukuba ............... H04N 19/107
2022/0295061 A1* 9/2022 Zhang .................. H04N 19/159

FOREIGN PATENT DOCUMENTS

CN 105594208 A 5/2016
CN 107646195 A 1/2018
CN 110035290 A 7/2019
CN 110100438 A 8/2019
CN 110839158 A 2/2020
CN 113574895 A 10/2021
EP 3565249 A1 11/2019
JP H10-164620 A 6/1998
WO 2019/006363 A1 1/2019
WO 2019/190907 A1 10/2019
WO 2020/182207 A1 9/2020
WO 2021/130374 A1 7/2021

OTHER PUBLICATIONS

Gao et al., "Simplified GEO Without Multiplication and Minimum Blending Mask Storage (Harmonization of JVET-P0108, JVET-P0264 and JVET-P0304)", JVET-P0884-V1, Huawei Technologies Co., Ltd, RWTH Aachen University, Joint Video Experts Team (JVET) of ITU-T SG 16 WP 3 and ISO/IEC JTC 1/SC 29/WG11, 16thMeeting: Geneva, CH, Oct. 1-11, 2019, pp. 1-6.
Iwamura et al., "CE6-Related: Implicit Transform Selection for Multi-Hypothesis Inter-Intra Mode", JVET-M0482-V3, NHK, Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.
Liao et al., "CE4-Related: Unification of Triangle Partition Mode and Geometric Merge Mode", JVET-P0305-V2, Alibaba Group, Joint Video Experts Team (JVET) of ITU-T SG 16 WP 3 and ISO/IEC JTC 1/SC 29/WG 11, 16th Meeting: Geneva, CH, Oct. 1-11, 2019, 7 pages.
Naser et al., "Non-CE4: Disabling TrSkip for Geo", JVET-Q0440, InterDigital, Joint Video Experts Team (JVET) of ITU-T SG 16 WP 3 and ISO/IEC JTC 1/SC 29/WG11, 17thMeeting: Brussels, BE, Jan. 7-17, 2020, pp. 1-3.
Peng et al., "Inter Transform Skipping", JCTVC-J0237, Microsoft Corp., Xidian Univ., Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-4.

* cited by examiner

100

TRANSFORM CODING FOR INTER-PREDICTED VIDEO DATA

CROSS-REFERENCE TO RELATED APPLICATIONS

This application is the National Stage Entry under 35 U.S.C. § 371 of Patent Cooperation Treaty Application No. PCT/EP2020/087881, filed Dec. 24, 2020, which claims the benefit of European Patent Application No. 19306778.2, filed Dec. 30, 2019, the disclosure of which is incorporated herein by reference in its entirety.

BACKGROUND

Video coding systems and apparatus may be used to compress digital video signals, e.g., to reduce the storage and/or transmission bandwidth needed for such signals. Video coding may utilize intra and/or inter prediction techniques, transform techniques, quantization techniques, etc. to compress video data. For certain types of coding units, some of these techniques may be increase encoding time and/or signaling overhead without providing significant coding gains.

SUMMARY

Described herein are systems, methods, and instrumentalities associated with versatile video coding. A video coding apparatus as described herein may include a video encoder that is configured to determine prediction residuals of a coding block (e.g., a coding unit) using an inter-prediction technique. The video encoder may determine that the inter-prediction technique is among a set of inter-prediction techniques for which at least one operation associated with transform coding is to be disabled. Based on the determination, the video encoder may disable the at least one operation associated with transform coding for the prediction residuals of the coding block, and encode the prediction residuals with the at least one operation associated with transform coding disabled. In examples, the at least one operation associated with transform coding to be disabled may comprise multiple transform selection (MTS). In examples, the at least one operation associated with transform coding to be disabled may comprise transform skip (TrSkip). In examples, disabling MTS for the prediction residuals of the coding block may comprise skipping performance of rate distortion search based on one or more candidate transforms for the coding block. In examples, the set of inter-prediction techniques for which MTS and/or TrSkip is disabled may include affine motion compensation, combined inter and intra prediction, triangular partition, and geometric merge.

A video coding apparatus as described herein may include a video decoder configured to obtain video data that comprises prediction residuals of a coding block (e.g., a coding unit). The video decoder may determine, based on the video data, that the prediction residuals comprised in the video data are determined using an inter-prediction technique that is among a set of inter-prediction techniques for which at least one operation associated with transform coding is disabled. Based on the determination, the video decoder may decode the prediction residuals of the coding block with the at least one operation associated with transform coding disabled. In examples, the at least one operation associated with transform coding that is disabled may comprise multiple transform selection (MTS). In examples, the at least one operation associated with transform coding that is disabled may comprise transform skip (TrSkip). In examples, decoding the prediction residuals of the coding block with MTS disabled may comprise skipping obtaining an MTS index from the video data. In examples, the set of inter-prediction techniques for which MTS and/or TrSkip is disabled may include affine motion compensation, combined inter and intra prediction, triangular partition, and geometric merge.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1-6D described herein may provide some examples, but other examples are contemplated and the discussion of FIGS. 1-6D does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 1:
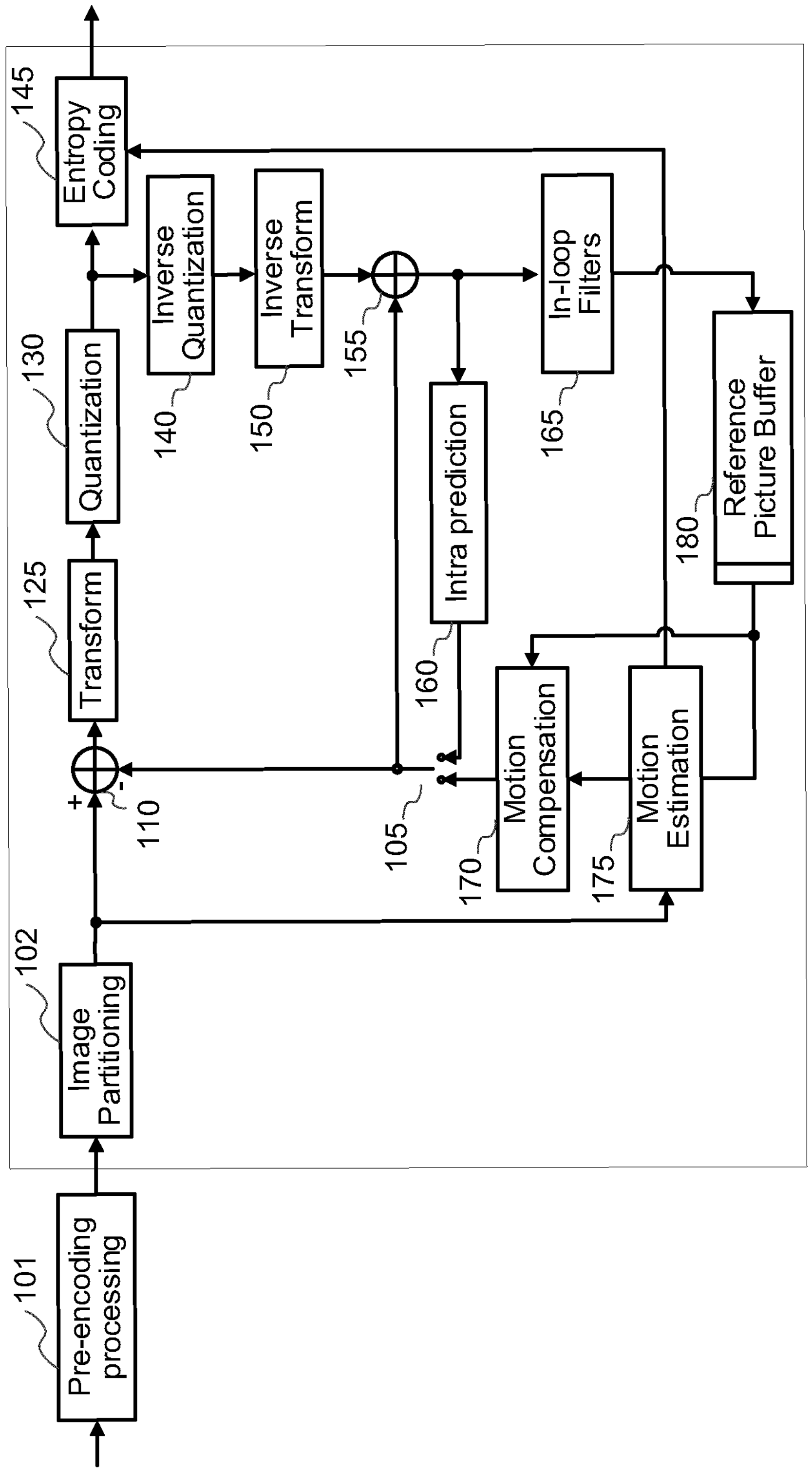
FIG. 1 is a diagram illustrating an example video encoder.
Figure 2:
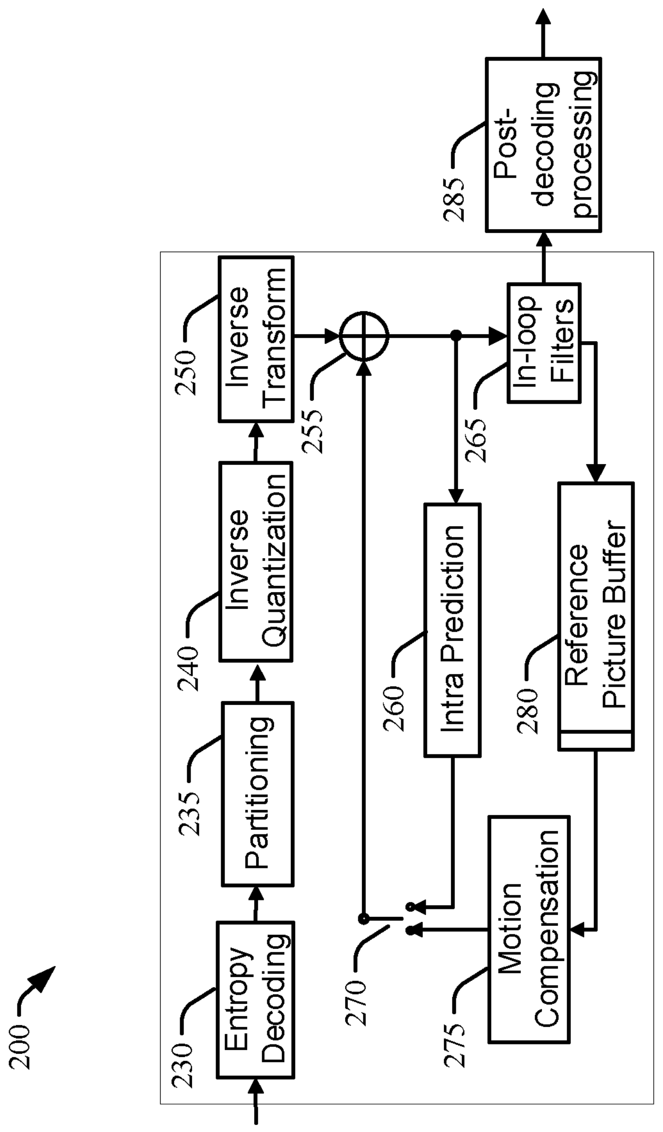
FIG. 2 is a diagram illustrating an example video decoder.

Various methods and other aspects described in this application can be used to modify modules, for example, decoding modules, of a video encoder 100 and decoder 200 as shown in FIG. 1 and FIG. 2. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this application can be used individually or in combination.

Various numeric values are used in the present application, for example, a sub-block having a size of 4×4, an index value being in the range of 0-82, etc. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 3:
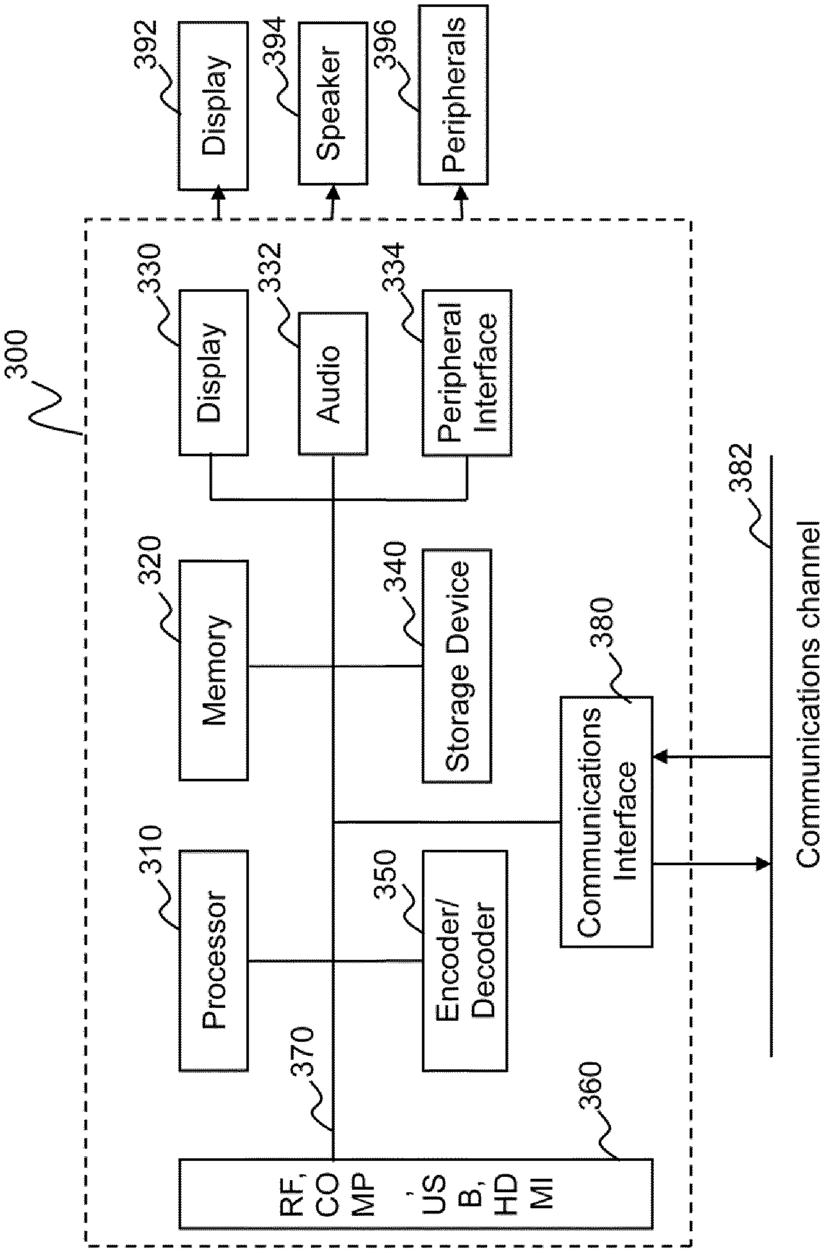
FIG. 3 is a diagram illustrating an example of a system in which various aspects and examples are implemented.
Figure 4:
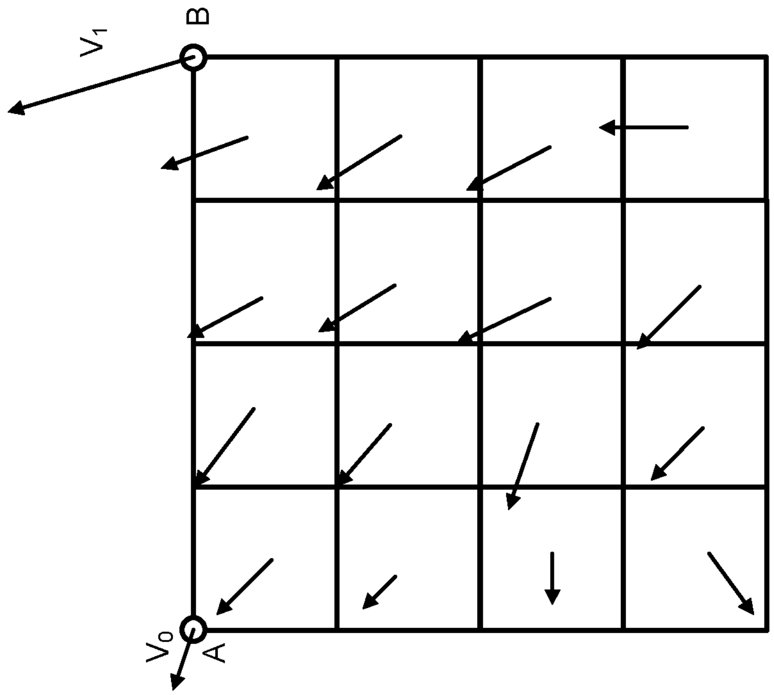
FIG. 4 is a diagram illustrating an example of affine motion compensation with two control points.

FIG. 3 illustrates a block diagram of an example of a system in which various aspects and examples are implemented. System 300 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 300, singly or in combination, can be embodied in a single integrated circuit (IC), multiple ICs, and/or discrete components. For example, in at least one example, the processing and encoder/decoder elements of system 300 are distributed across multiple ICs and/or discrete components. In various examples, the system 300 is communicatively coupled to one or more other systems, or other electronic devices, via, for example, a communications bus or through dedicated input and/or output ports. In various examples, the system 300 is configured to implement one or more of the aspects described in this document.

The system 300 includes at least one processor 310 configured to execute instructions loaded therein for implementing, for example, the various aspects described in this document. Processor 310 can include embedded memory, input output interface, and various other circuitries as known in the art. The system 300 includes at least one memory 320 (e.g., a volatile memory device, and/or a non-volatile memory device). System 300 includes a storage device 340, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 340 can include an internal storage device, an attached storage device (including detachable and non-detachable storage devices), and/or a network accessible storage device, as non-limiting examples.

System 300 includes an encoder/decoder module 350 configured, for example, to process data to provide an encoded video or decoded video, and the encoder/decoder module 350 can include its own processor and memory. The encoder/decoder module 350 represents module(s) that can be included in a device to perform the encoding and/or decoding functions. As is known, a device can include one or both of the encoding and decoding modules. Additionally, encoder/decoder module 350 can be implemented as a separate element of system 300 or can be incorporated within processor 310 as a combination of hardware and software as known to those skilled in the art.

Program code to be loaded onto processor 310 or encoder/decoder 350 to perform the various aspects described in this document can be stored in storage device 340 and subsequently loaded onto memory 320 for execution by processor 310. In accordance with various examples, one or more of processor 310, memory 320, storage device 340, and encoder/decoder module 350 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 310 and/or the encoder/decoder module 350 is used to store instructions and to provide working memory for processing that is needed during encoding or decoding. In other examples, however, a memory external to the processing device (for example, the processing device can be either the processor 310 or the encoder/decoder module 350) is used for one or more of these functions. The external memory can be the memory 320 and/or the storage device 340, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding).

The input to the elements of system 300 can be provided through various input devices as indicated in block 360. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various examples, the input devices of block 360 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 310 as necessary. Similarly, aspects of USB or HDMI interface processing can be implemented within separate interface ICs or within processor 310 as necessary. The demodulated, error corrected, and demultiplexed stream is provided to various processing elements, including, for example, processor 310, and encoder/decoder 350 operating in combination with the memory and storage elements to process the datastream as necessary for presentation on an output device.

Various elements of system 300 can be provided within an integrated housing. Within the integrated housing, the various elements can be interconnected and transmit data therebetween using suitable connection arrangement 370, for example, an internal bus as known in the art, including the Inter-IC (I2C) bus, wiring, and printed circuit boards.

The system 300 includes communication interface 380 that enables communication with other devices via communication channel 382. The communication interface 380 can include, but is not limited to, a transceiver configured to transmit and to receive data over communication channel 382. The communication interface 380 can include, but is not limited to, a modem or network card and the communication channel 382 can be implemented, for example, within a wired and/or a wireless medium.

Data is streamed, or otherwise provided, to the system 300, in various examples, using a wireless network such as a Wi-Fi network, for example IEEE 802.11 (IEEE refers to the Institute of Electrical and Electronics Engineers). The Wi-Fi signal of these examples is received over the communications channel 382 and the communications interface 350 which are adapted for Wi-Fi communications. The communications channel 382 of these examples is typically connected to an access point or router that provides access to external networks including the Internet for allowing streaming applications and other over-the-top communications. Other examples provide streamed data to the system 300 using a set-top box that delivers the data over the HDMI connection of the input block 360. Still other examples provide streamed data to the system 300 using the RF connection of the input block 360. As indicated above, various examples provide data in a non-streaming manner. Additionally, various examples use wireless networks other than Wi-Fi, for example a cellular network or a Bluetooth network.

The system 300 can provide an output signal to various output devices, including a display 392, speakers 394, and other peripheral devices 396. The display 392 of various examples includes one or more of, for example, a touch-screen display, an organic light-emitting diode (OLED) display, a curved display, and/or a foldable display. The display 392 can be for a television, a tablet, a laptop, a cell phone (mobile phone), or other device. The display 392 can also be integrated with other components (for example, as in a smart phone), or separate (for example, an external monitor for a laptop). The other peripheral devices 396 include, in various examples of examples, one or more of a stand-alone digital video disc (or digital versatile disc) (DVR, for both terms), a disk player, a stereo system, and/or a lighting system. Various examples use one or more peripheral devices 396 that provide a function based on the output of the system 300. For example, a disk player performs the function of playing the output of the system 300.

In various examples, control signals are communicated between the system 300 and the display 392, speakers 394, or other peripheral devices 396 using signaling such as AV.Link, Consumer Electronics Control (CEC), or other communications protocols that enable device-to-device control with or without user intervention. The output devices can be communicatively coupled to system 300 via dedicated connections through respective interfaces 330, 332, and 334. Alternatively, the output devices can be connected to system 300 using the communications channel 382 via the communications interface 380. The display 392 and speakers 394 can be integrated in a single unit with the other components of system 300 in an electronic device such as, for example, a television. In various examples, the display interface 330 includes a display driver, such as, for example, a timing controller (T Con) chip.

The display 392 and speakers 394 can alternatively be separate from one or more of the other components, for example, if the RF portion of input 370 is part of a separate set-top box. In various examples in which the display 392 and speakers 394 are external components, the output signal can be provided via dedicated output connections, including, for example, HDMI ports, USB ports, or COMP outputs.

The examples can be carried out by computer software implemented by the processor 310 or by hardware, or by a combination of hardware and software. As a non-limiting example, the examples can be implemented by one or more integrated circuits. The memory 320 can be of any type appropriate to the technical environment and can be implemented using any appropriate data storage technology, such as optical memory devices, magnetic memory devices, semiconductor-based memory devices, fixed memory, and removable memory, as non-limiting examples. The processor 310 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, receiving a multiple transform selection (MTS) index, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining whether MTS and/or transform strip are to be disabled for a coding unit.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, inter_affine_flag, ciip_flag, MergeTriangleFlag, wedge_merge_mode, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, this application may refer to "obtaining" various pieces of information. Obtaining is, as with "accessing" or "receiving", intended to be a broad term. Obtaining the information can include one or more of, for example, receiving the information, deriving the information (for example, via calculation and/or extraction), gaining the information, acquiring the information, capturing the information, accessing the information, or retrieving the information (for example, from memory). Further, "obtaining" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain examples the encoder signals whether a particular prediction technique is applied to a coding unit. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various examples. It is to be appreciated that signaling can be accomplished in a variety of ways. For example, one or more syntax elements, flags, and so forth are used to signal information to a corresponding decoder in various examples.

While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described example. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

A video processing system or apparatus such as a video encoder described herein may be configured to predict coding blocks (e.g., coding units) using one or more inter-prediction techniques or tools. These inter-prediction techniques may include, for example, affine motion compensation, combined inter and intra coding (CIIP), a triangular partition mode (TPM), and/or a geometric merge mode (GEO). The video coding apparatus may achieve various coding gains using these prediction techniques. For instance, with affine motion compensation, the video coding apparatus may achieve motion compensation beyond translational motion. In an example implementation of affine motion compensation, a video coding apparatus may assign a motion vector to a sub-block of size 4×4 (e.g., to each sub-block of size 4×4), e.g., based on a 4×4 sub-block based affine motion field. The video coding apparatus may compute the motion field based on one or more (e.g., two or three) control point motion vectors (CPMVs). FIG. 1 shows an example of affine motion compensation with two control points A and B (e.g., located at a top left corner and a top right corner, respectively). As shown, a video coding apparatus may divide a 16×16 coding block into 4×4 sub-blocks, and apply motion compensation to one or more of the sub-blocks (e.g., to each 4×4 sub-block) using respective motion vectors associated with the sub-blocks. These motion vectors may be determined (e.g., derived, calculated, etc.), for example, based on the control points A and B shown in the figure. The video coding apparatus may refine the result of affine motion compensation based on an optical flow (e.g., utilizing one or more prediction refinement with optical flow (PROF) techniques).

A video coding apparatus may indicate whether affine motion compensation is applied to a coding block (e.g., a coding unit or CU), for example, by including an inter affine indication (e.g., such as an inter_affine_flag) in a video bitstream. The video coding apparatus may indicate a number of CPMVs (e.g., two or three CPMVs) that are used for a coding block (e.g., a CU), for example, by including an affine type indication (e.g., such as a cu_affine_type_flag) in a video bitstream. The use of two CPMVs for a coding block (e.g., if two CPMVs are used to compute a sub-block based motion field) may correspond to a 4-parameter affine motion field for the coding block (e.g., a 4-parameter affine motion field may be computed for the coding block). The use of three CPMVs for a coding block (e.g., if three CPMVs are used to compute a sub-block based motion field) may correspond to a 6-parameter affine motion field for the coding block (e.g., a 6-parameter affine motion field may be computed for the coding block). Example syntax associated with affine motion compensation may be as follows:

TABLE 1

Example coding syntax associated with affine motion compensation

<table>
<tr><th></th><th>Descriptor</th></tr>
<tr><td>coding_unit( x0, y0, cbWidth, cbHeight, cqtDepth, treeType, modeType ) {</td><td></td></tr>
<tr><td>...</td><td></td></tr>
<tr><td>if( CuPredMode[ chType ][ x0 ][ y0 ] = = MODE_INTRA ||</td><td></td></tr>
<tr><td>CuPredMode[ chType ][ x0 ][ y0 ] = = MODE_PLT ){</td><td></td></tr>
<tr><td>...</td><td></td></tr>
<tr><td>} else if( treeType != DUAL_TREE_CHROMA ) {/* MODE_INTER or MODE_IBC */</td><td></td></tr>
<tr><td>...</td><td></td></tr>
<tr><td>if( general_merge_flag[ x0 ][ y0 ] )</td><td></td></tr>
<tr><td>merge_data( x0, y0, cbWidth, cbHeight, chType )</td><td></td></tr>
<tr><td>else if( CuPredMode[ chType ][ x0 ][ y0 ] = = MODE_IBC ) {</td><td></td></tr>
<tr><td>...</td><td></td></tr>
<tr><td>} else {</td><td></td></tr>
<tr><td>...</td><td></td></tr>
<tr><td>if( sps_affine_enabled_flag && cbWidth >= 16 && cbHeight >= 16 ) {</td><td></td></tr>
<tr><td>inter_affine_flag[ x0 ][ y0 ]</td><td>ae(v)</td></tr>
<tr><td>if( sps_affine_type_flag && inter_affine_flag[ x0 ][ y0 ] )</td><td></td></tr>
<tr><td>cu_affine_type_flag[ x0 ][ y0 ]</td><td>ae(v)</td></tr>
<tr><td>}</td><td></td></tr>
<tr><td>if( sps_smvd_enabled_flag && !mvd_l1_zero_flag &&</td><td></td></tr>
<tr><td>inter_pred_idc[ x0 ][ y0 ] = = PRED_BI &&</td><td></td></tr>
<tr><td>!inter_affine_flag[ x0 ][ y0 ] && RefIdxSymL0 > −1 && RefIdxSymL1 > −1 )</td><td></td></tr>
<tr><td>sym_mvd_flag[ x0 ][ y0 ]</td><td>ae(v)</td></tr>
<tr><td>...</td><td></td></tr>
<tr><td>if( ( sps_amvr_enabled_flag && inter_affine_flag[ x0 ][ y0 ] = = 0 &&</td><td></td></tr>
<tr><td>( MvdL0[ x0 ][ y0 ][ 0 ] != 0 || MvdL0[ x0 ][ y0 ][ 1 ] != 0 ||</td><td></td></tr>
<tr><td>MvdL1[ x0 ][ y0 ][ 0 ] != 0 || MvdL1[ x0 ][ y0 ][ 1 ] != 0 ) ) ||</td><td></td></tr>
<tr><td>(sps_affine_amvr_enabled_flag && inter_affine_flag[ x0 ][ y0 ] = = 1 &&</td><td></td></tr>
<tr><td>(MvdCpL0[ x0 ][ y0 ][ 0 ][ 0 ] != 0 || MvdCpL0[ x0 ][ y0 ][ 0 ][ 1 ] != 0 ||</td><td></td></tr>
<tr><td>MvdCpL1[ x0 ][ y0 ][ 0 ][ 0 ] != 0 || MvdCpL1[ x0 ][ y0 ][ 0 ][ 1 ] != 0 ||</td><td></td></tr>
</table>

TABLE 1-continued

<table>
<tr><th colspan="2">Example coding syntax associated with affine motion compensation</th></tr>
<tr><th></th><th>Descriptor</th></tr>
<tr><td>MvdCpL0[ x0 ][ y0 ][ 1 ][ 0 ] != 0 | | MvdCpL0[ x0 ][ y0 ][ 1 ][ 1 ] != 0 | |<br>MvdCpL1[ x0 ][ y0 ][ 1 ][ 0 ] != 0 | | MvdCpL1[ x0 ][ y0 ][ 1 ][ 1 ] != 0 | |<br>MvdCpL0[ x0 ][ y0 ][ 2 ][ 0 ] != 0 | | MvdCpL0[ x0 ][ y0 ][ 2 ][ 1 ] != 0 | |<br>MvdCpL1[ x0 ][ y0 ][2][ 0 ] != 0 | | MvdCpL1[ x0 ][ y0 ][2][ 1 ] != 0 ) )</td><td></td></tr>
<tr><td>{</td><td></td></tr>
<tr><td>amvr_flag[ x0 ][ y0 ]</td><td>ae(v)</td></tr>
<tr><td>...</td><td></td></tr>
<tr><td>}</td><td></td></tr>
<tr><td>...</td><td></td></tr>
<tr><td>}</td><td></td></tr>
<tr><td>}</td><td></td></tr>
<tr><td>}</td><td></td></tr>
</table>

A video coding apparatus may perform combined inter and intra prediction (CIIP) for a coding block (e.g., a CU). In examples, CIIP may be enabled for a coding block coded in a merge mode that may include at least 64 luma samples. The width and/or height of such a coding block may be less than 128 luma samples. The video coding apparatus may determine an inter prediction signal in the CIIP mode (e.g., $P_{inter}$), for example, using the same inter prediction technique(s) that may be applied in a merge mode. The video coding apparatus may determine an intra prediction signal (e.g., $P_{intra}$), for example, after performing an inter prediction with a planar mode. The prediction signals determined from the inter prediction and the intra prediction may be combined, for example, via weighted averaging, where the value of an applied weight may depend on the coding modes of one or more neighboring blocks of the current coding block (e.g., the current CU), such as the top and left neighboring blocks of the current coding block.

A video coding apparatus may indicate whether CIIP is applied to a coding block (e.g., a CU), for example, by including a CIIP indication (e.g., such as a ciip_flag) in a video bitstream (e.g., the indication having a value of 1 may indicate that CIIP is applied). The CIIP indication may be provided (e.g., signaled in a video bitstream) if one or more of the following conditions (e.g., all of the following conditions) are met for a coding block. For instance, the CIIP indication may be signaled and/or received if the prediction mode for the coding block is inter prediction. The CIIP indication may be signaled and/or received if an inter prediction mode for the coding block includes a merge mode. The CIIP indication may be signaled and/or received if intra block copy is not applied to the coding block. The CIIP indication may be signaled and/or received if merging of sub-blocks is not applied to the coding block. The CIIP indication may be signaled and/or received if merge with motion vector difference (MMVD) is not applied to the coding block. The CIIP indication may be signaled and/or received if a merge flag is equal to zero. The CIIP indication may be signaled and/or received if a coding block width (e.g., cbWidth) associated with the coding block is less than a threshold value (e.g., 128). The CIIP indication may be signaled and/or received if a coding block height (e.g., cbHeight) associated with the coding block is less than 128. The CIIP indication may be signaled and/or received if a coding block width associated with the coding block multiplied by a coding blocking height associated with the coding block (e.g., cbWidth*cbHeight) is greater than or equal to a threshold value (e.g., 64). The CIIP indication may be signaled and/or received if a triangle partition mode is not applied to the coding block.

As described herein, MMVD may be a mode in which a video coding apparatus may signal differential motion with specific values, and a merge mode may be a mode in which the video coding apparatus may not signal a motion vector. MMVD may be result in higher motion precision. If a triangular partition mode is not activated, a CIIP indication may be inferred to have a value that indicates that CIIP is used if one or more of the conditions described herein (e.g., all of the conditions described above) are met.

Table 2 below illustrates example syntax for signaling CIIP, for example, at a CU level or coding block level.

TABLE 2

<table>
<tr><th colspan="2">Example syntax associated with CIIP</th></tr>
<tr><th></th><th>Descriptor</th></tr>
<tr><td>merge_data( x0, y0, cbWidth, cbHeight, chType ) {</td><td></td></tr>
<tr><td>if( CuPredMode[ chType ][ x0 ][ y0 ] = = MODE_IBC ){</td><td></td></tr>
<tr><td>if( MaxNumIbcMergeCand > 1 )</td><td></td></tr>
<tr><td>merge_idx[ x0 ][ y0 ]</td><td>ae(v)</td></tr>
<tr><td>} else {</td><td></td></tr>
<tr><td>if( MaxNumSubblockMergeCand > 0 && cbWidth >= 8 && cbHeight >= 8 )</td><td></td></tr>
<tr><td>merge_subblock_flag[ x0 ][ y0 ]</td><td>ae(v)</td></tr>
<tr><td>if( merge_subblock_flag[ x0 ][ y0 ] = = 1 ) {</td><td></td></tr>
<tr><td>if( MaxNumSubblockMergeCand > 1 )</td><td></td></tr>
<tr><td>merge_subblock_idx[ x0 ][ y0 ]</td><td>ae(v)</td></tr>
<tr><td>} else {</td><td></td></tr>
<tr><td>if( ( cbWidth * cbHeight ) >= 64 && ( (sps_ciip_enabled_flag &&<br>cu_skip_flag[ x0 ][ y0 ] = = 0 && cbWidth < 128 && cbHeight < 128 ) | |</td><td></td></tr>
</table>

TABLE 2-continued

Example syntax associated with CIIP

```
                                                                      Descriptor
      (sps_triangle_enabled_flag && MaxNumTriangleMergeCand > 1 &&
      slice_type = = B ) ) )
      regular_merge_flag[ x0 ][ y0 ]                                  ae(v)
    if( regular_merge_flag[ x0 ][ y0 ] = = 1 ) {
      if( sps_mmvd_enabled_flag )
        mmvd_merge_flag[ x0 ][ y0 ]                                   ae(v)
      if( mmvd_merge_flag[ x0 ][ y0 ] = = 1 ) {
        if( MaxNumMergeCand > 1)
          mmvd_cand_flag[ x0 ][ y0 ]                                  ae(v)
        mmvd_distance_idx[ x0 ][ y0 ]                                 ae(v)
        mmvd_direction_idx[ x0 ][ y0 ]                                ae(v)
      } else if( MaxNumMergeCand > 1 )
        merge_idx[ x0 ][ y0 ]                                         ae(v)
    } else {
      if( sps_ciip_enabled_flag && sps_triangle_enabled_flag &&
        MaxNumTriangleMergeCand > 1 && slice_type = = B &&
        cu_skip_flag[ x0 ][ y0 ] = = 0 &&
        ( cbWidth * cbHeight ) >= 64 && cbWidth < 128 && cbHeight < 128 )
        ciip_flag[ x0 ][ y0 ]                                         ae(v)
      if( ciip_flag[ x0 ][ y0 ] && MaxNumMergeCand > 1 )
        merge_idx[ x0 ][ y0 ]                                         ae(v)
      if( !ciip_flag[ x0 ][ y0 ] && MaxNumTriangleMergeCand > 1 ) {
        merge_triangle_split_dir[ x0 ][ y0 ]                          ae(v)
        merge_triangle_idx0[ x0 ][ y0 ]                               ae(v)
        merge_triangle_idx1[ x0 ][ y0 ]                               ae(v)
      }
    }
   }
  }
}
```

Figure 5:
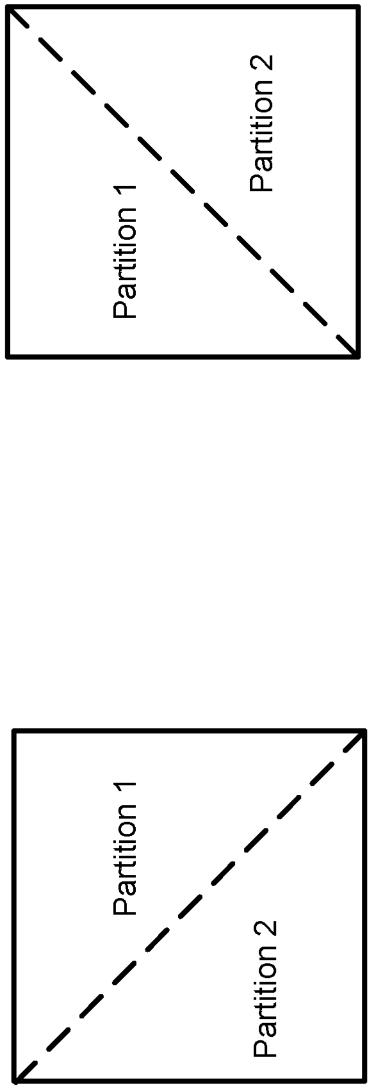
FIG. 5 is a diagram illustrating an example of triangle partition-based inter prediction.

A video coding apparatus may be configured to code a coding block (e.g., a CU) using a triangular partition mode (TPM). For example, the video coding apparatus may use TPM for coding blocks (e.g., inter-predicted coding blocks) of a certain size (e.g., 8×8 or larger). When TPM is used, the video coding apparatus may split a coding block (e.g., evenly) into one or more (e.g., two) triangle-shaped partitions. The video coding apparatus may indicate if a diagonal or anti-diagonal split is performed, for example, by including a triangle split partition direction indication in a video bitstream. FIG. 5 shows an example of triangle partition-based inter prediction. The diagram on the left shows a diagonal split for a coding block and the diagram on the right shows an anti-diagonal split for the coding block. Each of the partitions resulting from the diagonal or anti-diagonal split may be associated with a motion vector (e.g., with one motion vector) and/or a reference picture index.

Table 3 below illustrates example coding syntax associated with TPM.

TABLE 3

Example syntax associated with TPM

```
                                                                      Descriptor
merge_data( x0, y0, cbWidth, cbHeight, chType ) {
  if( CuPredMode[ chType ][ x0 ][ y0 ] = = MODE_IBC ) {
    if( MaxNumIbcMergeCand > 1 )
      merge_idx[ x0 ][ y0 ]                                           ae(v)
  } else {
    if( MaxNumSubblockMergeCand > 0 && cbWidth >= 8 && cbHeight >= 8 )
      merge_subblock_flag[ x0 ][ y0 ]                                 ae(v)
    if( merge_subblock_flag[ x0 ][ y0 ] = = 1 ) {
      if( MaxNumSubblockMergeCand > 1 )
        merge_subblock_idx[ x0 ][ y0 ]                                ae(v)
    } else {
      if( ( cbWidth * cbHeight ) >= 64 && ( (sps_ciip_enabled_flag &&
        cu_skip_flag[ x0 ][ y0 ] = = 0 && cbWidth < 128 && cbHeight < 128 ) | |
        ( sps_triangle_enabled_flag && MaxNumTriangleMergeCand > 1 &&
        slice_type = = B ) ) )
        regular_merge_flag[ x0 ][ y0 ]                                ae(v)
      if( regular_merge_flag[ x0 ][ y0 ] = = 1 ) {
        if( sps_mmvd_enabled_flag )
          mmvd_merge_flag[ x0 ][ y0 ]                                 ae(v)
```

TABLE 3-continued

Example syntax associated with TPM

| | Descriptor |
|---|---|
| if( mmvd_merge_flag[ x0 ][ y0 ] = = 1 ) { | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else if( MaxNumMergeCand > 1 ) | |
| merge_idx[ x0 ][ y0 ] | ae(v) |
| } else { | |
| if( sps_ciip_enabled_flag && sps_triangle_enabled_flag && | |
| MaxNumTriangleMergeCand > 1 && slice_type = = B && | |
| cu_skip_flag[ x0 ][ y0 ] = = 0 && | |
| ( cbWidth * cbHeight) >= 64 && cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[ x0 ][ y0 ] && MaxNumTriangleMergeCand > 1 ) { | |
| merge_triangle_split_dir[ x0 ][ y0 ] | ae(v) |
| merge_triangle_idx0[ x0 ][ y0 ] | ae(v) |
| if( MaxNumTriangleMergeCand > 2 ) | |
| merge_triangle_idx1[ x0 ][ y0 ] | ae(v) |
| } | |
| } | |
| } | |
| } | |
| } | |

A video coding apparatus may be configured to code a coding block (e.g., a CU) using a geometric merge mode (GEO). GEO may be associated with inter prediction (e.g., GEO may be an inter prediction technique or tool). GEO may be an extension of TPM, where a split may be extended from being diagonal or anti-diagonal to being at one or more angles and/or one or more displacements from the partition boundary relative to the middle of a coding block.

Table 4 below illustrates example coding syntax associated with GEO, which may also be referred to by other names such as a wedge merge mode. The enablement/disablement of GEO may be indicated by a flag such as wedge_merge_mode, MergeGpmFlag, etc.

TABLE 4

Example syntax associated with GEO

| | Descriptor |
|---|---|
| merge_data( x0, y0, cbWidth, cbHeight, chType ) { | |
| if ( CuPredMode[ chType ][ x0 ][ y0 ] = = MODE_IBC ){ | |
| if( MaxNumIbcMergeCand > 1 ) | |
| merge_idx[ x0 ][ y0 ] | ae(v) |
| } else { | |
| if( MaxNumSubblockMergeCand > 0 && cbWidth >= 8 && cbHeight >= 8 ) | |
| merge_subblock_flag[ x0 ][ y0 ] | ae(v) |
| if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( ( cbWidth * cbHeight ) >= 64 && ( ( sps_ciip_enabled_flag && | |
| cu_skip_flag[ x0 ][ y0 ] = = 0 && cbWidth < 128 && cbHeight < 128) \|\| | |
| ( sps_wedge_enabled_flag && MaxNumWedgeMergeCand > 1 && | |
| cbWidth>=8 && cbHeight>=8 && slice_type = = B ) ) ) | |
| regular_merge_flag[ x0 ][ y0 ] | ae(v) |
| if (regular_merge_flag[ x0 ][ y0 ] = = 1 ){ | |
| if( sps_mmvd_enabled_flag ) | |
| mmvd_merge_flag[ x0 ][ y0 ] | ae(v) |
| if( mmvd_merge_flag[ x0 ][ y0 ] = = 1) { | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else { | |
| if( MaxNumMergeCand > 1 ) | |
| merge_idx[ x0 ][ y0 ] | ae(v) |
| } | |
| } else { | |
| if( sps_ciip_enabled_flag && sps_wedge_enabled_flag && | |
| MaxNumWedgeMergeCand > 1 && slice_type = = B && | |

TABLE 4-continued

| Example syntax associated with GEO | Descriptor |
|---|---|
| cu_skip_flag[ x0 ][ y0 ] = = 0 && | |
| cbWidth >= 8 && cbHeight >= 8 && cbWidth < 128 && cbHeight < 128 | |
| ) { | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[ x0 ][ y0 ] && MaxNumWedgeMergeCand > 1 ) { | |
| wedge_partition_idx[ x0 ][ y0 ] | ae(v) |
| merge_wedge_idx0[ x0 ][ y0 ] | ae(v) |
| merge_wedge_idx1[ x0 ][ y0 ] | ae(v) |
| } | |
| } | |
| } | |
| } | |
| } | |

A video coding apparatus may be configured to signal the use of GEO at a coding block or CU level, for example, by including a partition index such as wedge_partition_idx in a video bitstream. The value of such an index may range, for example, from 0 to 82. The angle and/or direction of a split may be determined based on the index.

A video coding apparatus such as a video encoder described herein may be configured to enable one or more operations associated with transform coding for a first set of coding techniques or tools (e.g., intra prediction techniques or tools), and disable the one or more operations associated with transform coding for a second set of coding techniques or coding modes (e.g., inter prediction techniques or tools). These disabled (or to-be-disabled) transform coding related operations may include, for example, multiple transform selection (MTS), transform skip (TrSkip), and/or the like. MTS may include testing different transform types (e.g., for a coding block or CU) and selecting one (e.g., a horizontal transform, a vertical transform, etc.) that provides optimal rate distortion performance. TrSkip may include skipping one or more transform related operations in an encoder and a decoder. For example, if TrSkip is applied, pixel domain data may not be transformed into a transform domain at an encoder, and transform domain data may not be transformed back to the pixel domain at a decoder.

In examples, a video coding apparatus such as a video encoder described herein may be configured to apply MTS for an intra-predicted coding block (e.g., an intra-predicted CU) since, e.g., the residuals from the intra prediction may have a spatially smooth distribution and MTS may provide meaningful coding gains (e.g., 1%) for such an intra-predicted coding block. In examples, a video coding apparatus such as a video encoder described herein may be configured to disable MTS for a coding block (e.g., a CU) if the video coding apparatus decides that the coding block is coded (e.g., predicted) using one or more inter-prediction techniques that are among a set of predetermined inter-prediction techniques for which MTS is to be disabled. Such a set of predetermined inter-prediction techniques may include, for example, affine motion compensation, CIIP, TPM, and/or GEO. An example reason for disabling MTS in these situations may be that residuals predicted using a discontinuous inter-prediction technique such as affine motion compensation, TPM, etc. may not have a spatially smooth distribution, and MTS may not provide significant coding gains for such an inter-predicted coding block (e.g., the gain may be only approximately 0.2%). The video coding apparatus may be configured to disable MTS for affine motion compensation, CIIP, TPM, GEO, and/or a combination thereof. When MTS is disabled, the video coding apparatus may skip performing rate distortion (RD) search for one or more candidate transform types with minimum impact on coding gains.

In examples, if one or more of affine motion compensation, CIIP, TPM, or GEO are used to code a coding block (e.g., a CU), a video coding apparatus such as a video encoder described herein may not code (e.g., signal) an MTS index in a video bitstream. The video coding apparatus may use a separable transform pair such as (DCT2, DCT2) for the coding block, where DCT2 may refer to a 2D discrete cosine transform.

A video coding apparatus such as a video decoder described herein may determine whether to attempt to process (e.g., receive and/or decode) an MTS index (e.g., from a video bitstream) for a current coding block (e.g., a current CU) based at least in part on whether the coding block is coded (e.g., predicted) using one or more inter-prediction techniques that are among a set of predetermined inter-prediction techniques for which MTS is to be disabled. Such a set of predetermined inter-prediction techniques may include, for example, affine motion compensation, CIIP, TPM, and/or GEO. If the video coding apparatus determines that one or more of affine motion compensation, CIIP, TPM, or GEO are used to code the current coding block, the video coding apparatus may skip processing (e.g., skip attempting to receive or extract) the MTS index (e.g., from the video bitstream), and may decode the coding block with MTS disabled.

Table 5 below illustrates example syntax associated with disabling MTS for affine motion compensation, CIIP, TPM, and/or a combination thereof.

TABLE 5

Example syntax associated with disabling MTS

| | Descriptor |
|---|---|
| coding_unit( x0, y0, cbWidth, cbHeight, cqtDepth, treeType, modeType ) { | |
| ... | |
| if( cu_cbf ) { | |
| ... | |
| if( treeType != DUAL_TREE_CHROMA && lfnst_idx = = 0 && | |
| transform_skip_flag[ x0 ][ y0 ][ 0 ] = = 0 && Max( cbWidth, cbHeight ) <= 32 && | |
| IntraSubPartitionsSplit[ x0 ][ y0 ] = = ISP_NO_SPLIT && cu_sbt_flag = = 0 && | |
| MtsZeroOutSigCoeffFlag = = 1 && tu_cbf_luma[ x0 ][ y0 ] && inter_affine_flag[ x0 ][ y0 ] = 0 && ciip_flag[ x0 ][ y0 ] == 0 && MergeTriangleFlag[ x0 ][ y0 ] = 0 ) { | |
| if( ( ( CuPredMode[ chType ][ x0 ][ y0 ] = = MODE_INTER && | |
| sps_explicit_mts_inter_enabled_flag ) \| \| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | |
| } | |

Table 6 below illustrates example syntax associated with disabling MTS for affine motion compensation, CIIP, GEO, and/or a combination thereof. The various prediction techniques or modes may also be referred to by other names and/or be enabled/disabled via one or more flags. For instance, GEO may also be referred to as a wedge merge mode and may be enabled/disabled by a flag such as wedge_merge_mode, MergeGpmFlag, etc.

TABLE 6

Example syntax associated with disabling MTS

| | Descriptor |
|---|---|
| coding_unit( x0, y0, cbWidth, cbHeight, cqtDepth, treeType, modeType ) { | |
| ... | |
| if( cu_cbf ) { | |
| ... | |
| if( treeType != DUAL_TREE_CHROMA && lfnst_idx = = 0 && | |
| transform_skip_flag[ x0 ][ y0 ][ 0 ] = = 0 && Max( cbWidth, cbHeight ) <= 32 && | |
| IntraSubPartitionsSplit[ x0 ][ y0 ] = = ISP_NO_SPLIT && cu_sbt_flag = = 0 && | |
| MtsZeroOutSigCoeffFlag = = 1 && tu_cbf_luma[ x0 ][ y0 ] && inter_affine_flag[ x0 ][ y0 ] = 0 && ciip_flag[ x0 ][ y0 ] == 0 && wedge_merge_mode[ x0 ][ y0 ] = 0 ) { | |
| if( ( ( CuPredMode[ chType ][ x0 ][ y0 ] = = MODE_INTER && | |
| sps_explicit_mts_inter_enabled_flag ) \| \| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | |
| } | |

In an example, a video coding apparatus such as a video encoder described herein may be configured to disable MTS for a subset of affine motion compensation, CIIP, TPM, or GEO (e.g., instead of disabling MTS for all of these modes). A flag may be used to indicate that MTS is disabled for one or a combination of affine motion compensation, CIIP, TPM, or GEO. For instance, a flag (e.g., rather than multiple flags) may be used to indicate that MTS is disabled for only Geo, for only CIIP, for only TPM, for CIIP and Geo, for CIIP and TPM, for TPM and Geo, etc.

A video coding apparatus such as a video encoder described herein may be configured to disable transform skip (TrSkip) for a coding block (e.g., a CU) if the coding block is predicted using one or more inter-prediction techniques that are among a set of predetermined inter-prediction techniques for which TrSkip is to be disabled. Such a set of predetermined inter-prediction techniques may include, for example, affine motion compensation, CIIP, TPM, and/or GEO. The video coding apparatus may be configured to disable TrSkip for affine motion compensation, CIIP, TPM, GEO, and/or a combination thereof. An example reason for disabling TrSkip in these situations may be that using TrSkip in combination with the aforementioned inter-prediction tools may not provide enough coding gain given the encoding time involved.

If one or more of affine motion compensation, CIIP, TPM, and/or GEO are used to code a coding block (e.g., a CU), a video coding apparatus such as a video encoder described herein may not code (e.g., signaled) a TrSkip indication in a video bitstream. On the receiving side, a video coding apparatus such as a video decoder described herein may determine whether to process (e.g., receive and/or decode) a TrSkip indication for a current coding block based at least in part on whether one or more of affine motion compensation, CIIP, TPM, and/or GEO is used to code the current coding block. If one or more of affine motion compensation, CIIP, TPM, and/or GEO are used to code the current coding block, the video coding apparatus may skip receiving (e.g., extracting) a TrSkip indication (e.g., from the video bitstream), and may decode the coding block with TrSkip disabled.

Table 7 below illustrates example syntax associated with disabling TrSkip for affine motion compensation, CIIP, TPM, and/or a combination.

TrSkip for a subset of affine motion compensation, CIIP, TPM, and/or GEO (e.g., instead of disabling TrSkip for all of these modes). A flag may be used to indicate that TrSkip is disabled for one or a combination of affine motion compensation, CIIP, TPM, or GEO. For instance, a flag (e.g., rather than multiple flags) may be used to indicate that TrSkip is disabled for only Geo, for only CIIP, for only TPM, for CIIP and Geo, for CIIP and TPM, for TPM and Geo, etc.

TABLE 7

Example syntax associated with disabling TrSkip

| | Descriptor |
|---|---|
| transform_unit( x0, y0, tbWidth, tbHeight, treeType, subTuIndex, chType ) { | |
| ... | |
| if( tu_cbf_cb[ xC ][ yC ] && treeType != DUAL_TREE_LUMA ) { | |
| if( sps_transform_skip_enabled_flag && !BdpcmFlag[ x0 ][ y0 ][ 1 ] && | |
| wC <= MaxTsSize && hC <= MaxTsSize && !cu_sbt_flag ] && | |
| inter_affine_flag[ x0 ][ y0 ] = 0 && ciip_flag[ x0 ][ y0 ] == 0 && | |
| MergeTriangleFlag[ x0 ][ y0 ] = 0 ) | |
| transform_skip_flag[ xC ][ yC ][ 1 ] | ae(v) |
| ... | |
| } | |
| if( tu_cbf_cr[ xC ][ yC ] && treeType != DUAL_TREE_LUMA && | |
| !(tu_cbf_cb[ xC ][ yC ] && tu_joint_cbcr_residual_flag[ xC ][ yC ] ) ) ] && | |
| inter_affine_flag[ x0 ][ y0 ] = 0 && ciip_flag[ x0 ][ y0 ] == 0 && | |
| MergeTriangleFlag[ x0 ][ y0 ] = 0) { | |
| if( sps_transform_skip_enabled_flag && !BdpcmFlag[ x0 ][ y0 ][ 2 ] && | |
| wC <= MaxTsSize && hC <= MaxTsSize && !cu_sbt_flag ) | |
| transform_skip_flag[ xC ][ yC ][ 2 ] | ae(v) |
| ... | |
| } | |
| } | |

Table 8 below illustrates example syntax associated with disabling transform skip for affine motion compensation, CIIP, GEO, and/or a combination thereof. The various prediction techniques or modes may also be referred to by other names and/or be enabled/disabled via one or more flags. For instance, GEO may also be referred to as a wedge merge mode and may be enabled/disabled by a flag such as wedge_merge_mode, MergeGpmFlag, etc.

Figure 6A:
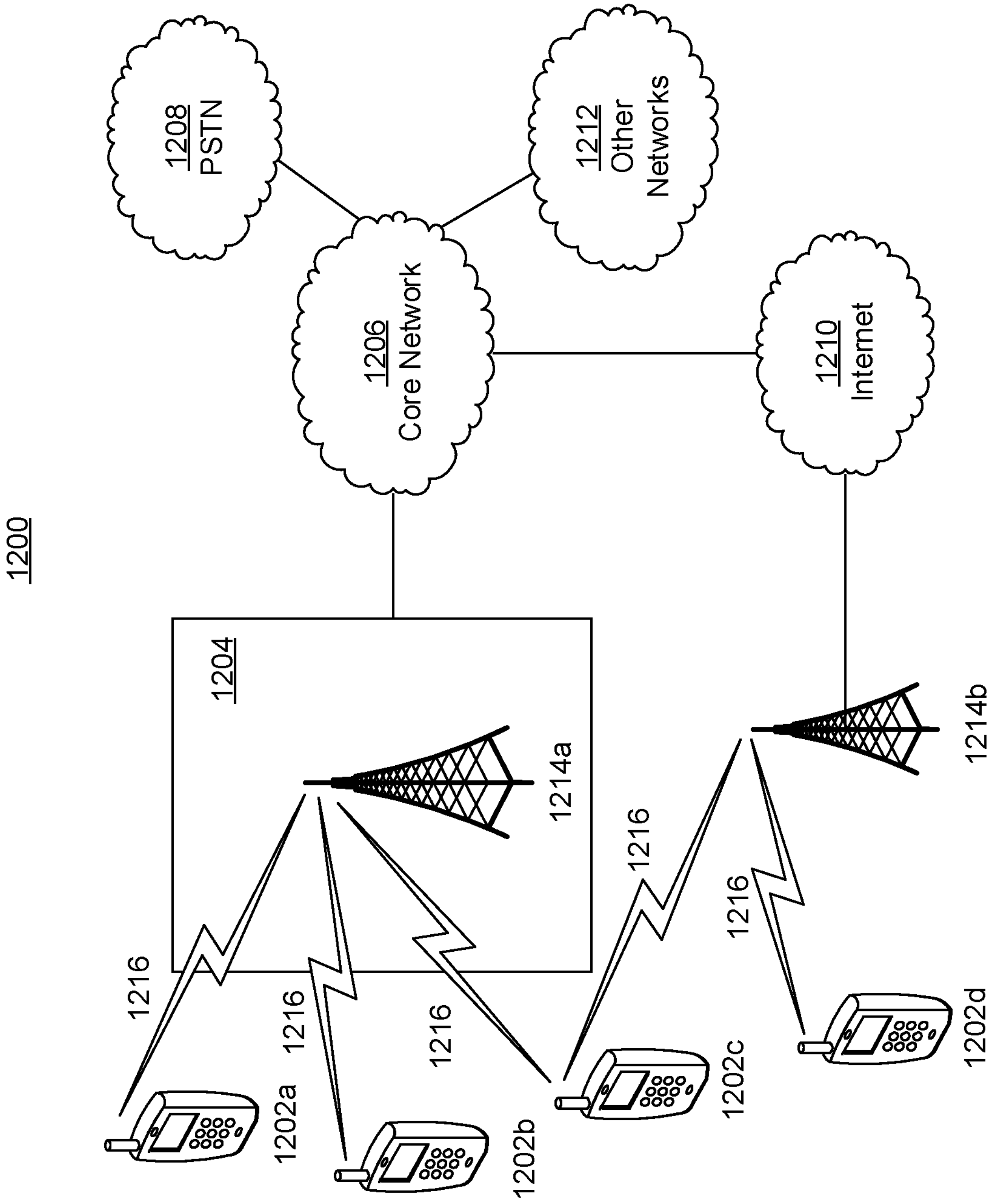
FIG. 6A is a system diagram illustrating an example communications system in which one or more disclosed examples may be implemented.

FIG. 6A is a diagram illustrating an example communications system 1200 in which one or more disclosed examples may be implemented. The communications system 1200 may be a multiple access system that provides content, such as voice, data, video, messaging, broadcast, etc., to multiple wireless users. The communications system 1200 may enable multiple wireless users to access such content through the sharing of system resources, including

TABLE 8

Example syntax associated with disabling TrSkip

| | Descriptor |
|---|---|
| transform_unit( x0, y0, tbWidth, tbHeight, treeType, subTuIndex, chType ) { | |
| ... | |
| if( tu_cbf_cb[ xC ][ yC ] && treeType != DUAL_TREE_LUMA ) { | |
| if( sps_transform_skip_enabled_flag && !BdpcmFlag[ x0 ][ y0 ][ 1 ] && | |
| wC <= MaxTsSize && hC <= MaxTsSize && !cu_sbt_flag ] && | |
| inter_affine_flag[ x0 ][ y0 ] = 0 && ciip_flag[ x0 ][ y0 ] == 0 && | |
| wedge_merge_mode[ x0 ][ y0 ] = 0 ) | |
| transform_skip_flag[ xC ][ yC ][ 1 ] | ae(v) |
| ... | |
| } | |
| if( tu_cbf_cr[ xC ][ yC ] && treeType != DUAL_TREE_LUMA && | |
| !( tu_cbf_cb[ xC ][ yC ] && tu_joint_cbcr_residual_flag[ xC ][ yC ] ) ) ] && | |
| inter_affine_flag[ x0 ][ y0 ] = 0 && ciip_flag[ x0 ][ y0 ] == 0 && wedge_merge_mode | |
| [ x0 ][ y0 ] = 0 ){ | |
| if( sps_transform_skip_enabled_flag && !BdpcmFlag[ x0 ][ y0 ][ 2 ] && | |
| wC <= MaxTsSize && hC <= MaxTsSize && !cu_sbt_flag ) | |
| transform_skip_flag[ xC ][ yC ][ 2 ] | ae(v) |
| ... | |
| } | |
| } | |

In examples, a video coding apparatus such as a video encoder described herein may be configured to disable wireless bandwidth. For example, the communications systems 1200 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 6A, the communications system 1200 may include wireless transmit/receive units (WTRUs) 1202*a*, 1202*b*, 1202*c*, 1202*d*, a RAN 1204/1213, a CN 1206/1215, a public switched telephone network (PSTN) 1208, the Internet 1210, and other networks 1212, though it will be appreciated that the disclosed examples contemplate any number of WTRUs, base stations, networks, and/or network elements. Each of the WTRUs 1202*a*, 1202*b*, 1202*c*, 1202*d* may be any type of device configured to operate and/or communicate in a wireless environment. By way of example, the WTRUs 1202*a*, 1202*b*, 1202*c*, 1202*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 1202*a*, 1202*b*, 1202*c* and 1202*d* may be interchangeably referred to as a UE.

The communications systems 1200 may also include a base station 1214*a* and/or a base station 1214*b*. Each of the base stations 1214*a*, 1214*b* may be any type of device configured to wirelessly interface with at least one of the WTRUs 1202*a*, 1202*b*, 1202*c*, 1202*d* to facilitate access to one or more communication networks, such as the CN 1206/1215, the Internet 1210, and/or the other networks 1212. By way of example, the base stations 1214*a*, 1214*b* may be a base transceiver station (BTS), a Node-B, an eNode B, a Home Node B, a Home eNode B, a gNB, a NR NodeB, a site controller, an access point (AP), a wireless router, and the like. While the base stations 1214*a*, 1214*b* are each depicted as a single element, it will be appreciated that the base stations 1214*a*, 1214*b* may include any number of interconnected base stations and/or network elements.

The base station 1214*a* may be part of the RAN 1204/1213, which may also include other base stations and/or network elements (not shown), such as a base station controller (BSC), a radio network controller (RNC), relay nodes, etc. The base station 1214*a* and/or the base station 1214*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1214*a* may be divided into three sectors. Thus, in one example, the base station 1214*a* may include three transceivers, i.e., one for each sector of the cell. In an example, the base station 1214*a* may employ multiple-input multiple output (MIMO) technology and may utilize multiple transceivers for each sector of the cell. For example, beamforming may be used to transmit and/or receive signals in desired spatial directions.

The base stations 1214*a*, 1214*b* may communicate with one or more of the WTRUs 1202*a*, 1202*b*, 1202*c*, 1202*d* over an air interface 1216, which may be any suitable wireless communication link (e.g. radio frequency (RF), microwave, centimeter wave, micrometer wave, infrared (IR), ultraviolet (UV), visible light, etc.). The air interface 1216 may be established using any suitable radio access technology (RAT).

More specifically, as noted above, the communications system 1200 may be a multiple access system and may employ one or more channel access schemes, such as CDMA, TDMA, FDMA, OFDMA, SC-FDMA, and the like. For example, the base station 1214*a* in the RAN 1204/1213 and the WTRUs 1202*a*, 1202*b*, 1202*c* may implement a radio technology such as Universal Mobile Telecommunications System (UMTS) Terrestrial Radio Access (UTRA), which may establish the air interface 1215/1216/1217 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 1214*a* and the WTRUs 1202*a*, 1202*b*, 1202*c* may implement a radio technology such as Evolved UMTS Terrestrial Radio Access (E-UTRA), which may establish the air interface 1216 using Long Term Evolution (LTE) and/or LTE-Advanced (LTE-A) and/or LTE-Advanced Pro (LTE-A Pro).

In an example, the base station 1214*a* and the WTRUs 1202*a*, 1202*b*, 1202*c* may implement a radio technology such as NR Radio Access, which may establish the air interface 1216 using New Radio (NR).

In an example, the base station 1214*a* and the WTRUs 1202*a*, 1202*b*, 1202*c* may implement multiple radio access technologies. For example, the base station 1214*a* and the WTRUs 1202*a*, 1202*b*, 1202*c* may implement LTE radio access and NR radio access together, for instance using dual connectivity (DC) principles. Thus, the air interface utilized by WTRUs 1202*a*, 1202*b*, 1202*c* may be characterized by multiple types of radio access technologies and/or transmissions sent to/from multiple types of base stations (e.g. an eNB and a gNB).

In other examples, the base station 1214*a* and the WTRUs 1202*a*, 1202*b*, 1202*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1214*b* in FIG. 6A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one example, the base station 1214*b* and the WTRUs 1202*c*, 1202*d* may implement a radio technology such as IEEE 802.11 to establish a wireless local area network (WLAN). In an example, the base station 1214*b* and the WTRUs 1202*c*, 1202*d* may implement a radio technology such as IEEE 802.15 to establish a wireless personal area network (WPAN). In yet another example, the base station 1214*b* and the WTRUs 1202*c*, 1202*d* may utilize a cellular-based RAT (e.g. WCDMA, CDMA2000, GSM, LTE, LTE-A, LTE-A Pro, NR etc.) to establish a picocell or femtocell. As shown in FIG. 6A, the base station 1214*b* may have a direct connection to the Internet 1210. Thus, the base station 1214*b* may not be required to access the Internet 1210 via the CN 1206/1215.

The RAN 1204/1213 may be in communication with the CN 1206/1215, which may be any type of network configured to provide voice, data, applications, and/or voice over internet protocol (VoIP) services to one or more of the WTRUs 1202*a*, 1202*b*, 1202*c*, 1202*d*. The data may have varying quality of service (QoS) requirements, such as differing throughput requirements, latency requirements, error tolerance requirements, reliability requirements, data throughput requirements, mobility requirements, and the like. The CN 1206/1215 may provide call control, billing services, mobile location-based services, pre-paid calling, Internet connectivity, video distribution, etc., and/or perform high-level security functions, such as user authentication. Although not shown in FIG. 6A, it will be appreciated that the RAN 1204/1213 and/or the CN 1206/1215 may be in direct or indirect communication with other RANs that employ the same RAT as the RAN 1204/1213 or a different RAT. For example, in addition to being connected to the RAN 1204/1213, which may be utilizing a NR radio technology, the CN 1206/1215 may also be in communication with another RAN (not shown) employing a GSM, UMTS, CDMA 2000, WiMAX, E-UTRA, or WiFi radio technology.

The CN 1206/1215 may also serve as a gateway for the WTRUs 1202*a*, 1202*b*, 1202*c*, 1202*d* to access the PSTN 1208, the Internet 1210, and/or the other networks 1212. The PSTN 1208 may include circuit-switched telephone networks that provide plain old telephone service (POTS). The Internet 1210 may include a global system of interconnected computer networks and devices that use common communication protocols, such as the transmission control protocol (TCP), user datagram protocol (UDP) and/or the internet protocol (IP) in the TCP/IP internet protocol suite. The networks 1212 may include wired and/or wireless communications networks owned and/or operated by other service providers. For example, the networks 1212 may include another CN connected to one or more RANs, which may employ the same RAT as the RAN 1204/1213 or a different RAT.

Some or all of the WTRUs 1202*a*, 1202*b*, 1202*c*, 1202*d* in the communications system 100 may include multi-mode capabilities (e.g. the WTRUs 1202*a*, 1202*b*, 1202*c*, 1202*d* may include multiple transceivers for communicating with different wireless networks over different wireless links). For example, the WTRU 1202*c* shown in FIG. 6A may be configured to communicate with the base station 1214*a*, which may employ a cellular-based radio technology, and with the base station 1214*b*, which may employ an IEEE 802 radio technology.

Figure 6B:
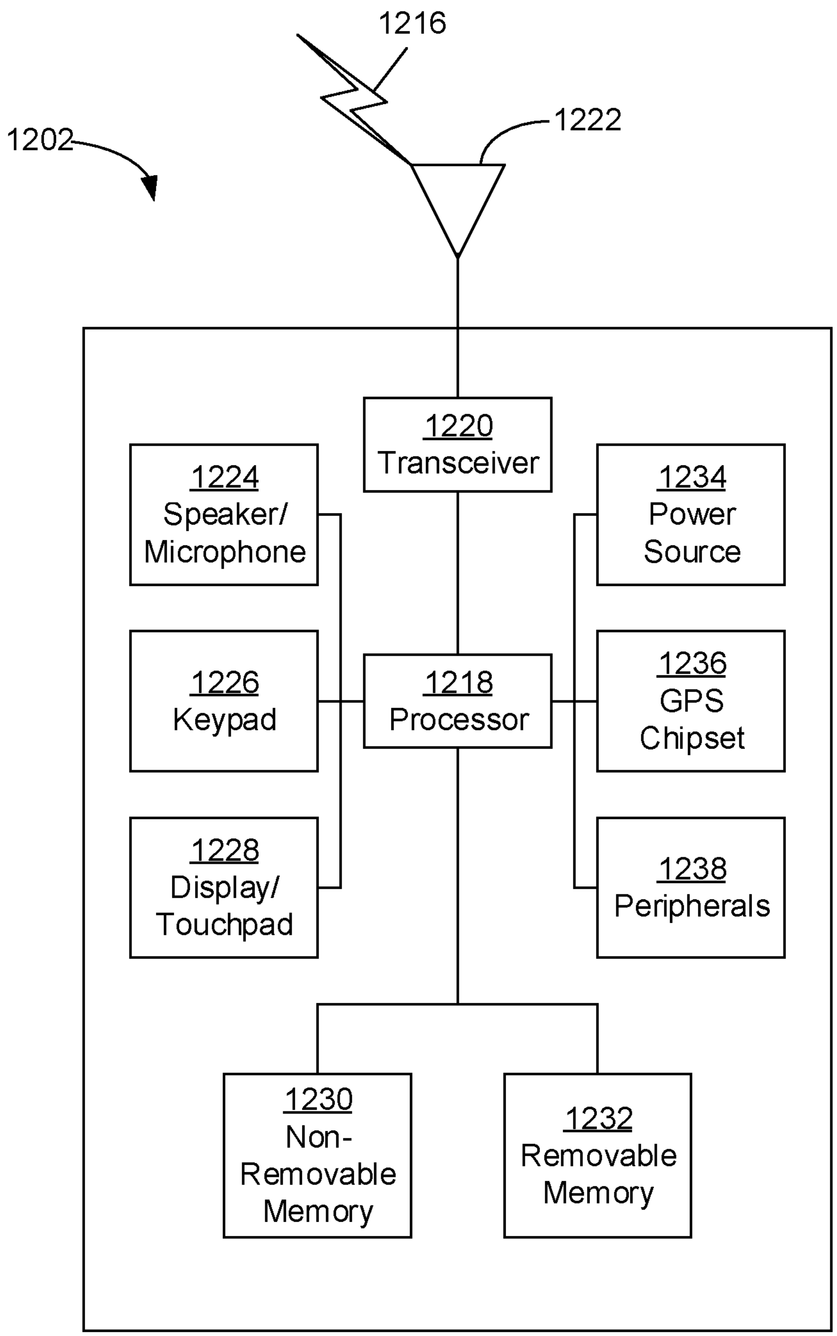
FIG. 6B is a system diagram illustrating an example wireless transmit/receive unit (WTRU) that may be used within the communications system illustrated in FIG. 6A according to an example.

FIG. 6B is a system diagram illustrating an example WTRU 1202. As shown in FIG. 6B, the WTRU 1202 may include a processor 1218, a transceiver 1220, a transmit/receive element 1222, a speaker/microphone 1224, a keypad 1226, a display/touchpad 1228, non-removable memory 1230, removable memory 1232, a power source 1234, a global positioning system (GPS) chipset 1236, and/or other peripherals 1238, among others. It will be appreciated that the WTRU 1202 may include any sub-combination of the foregoing elements while remaining consistent with an example.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 6B depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station (e.g. the base station 1214*a*) over the air interface 1216. For example, in one example, the transmit/receive element 1222 may be an antenna configured to transmit and/or receive RF signals. In an example, the transmit/receive element 1222 may be an emitter/detector configured to transmit and/or receive IR, UV, or visible light signals, for example. In yet another example, the transmit/receive element 1222 may be configured to transmit and/or receive both RF and light signals. It will be appreciated that the transmit/receive element 1222 may be configured to transmit and/or receive any combination of wireless signals.

Although the transmit/receive element 1222 is depicted in FIG. 9B as a single element, the WTRU 1202 may include any number of transmit/receive elements 1222. More specifically, the WTRU 1202 may employ MIMO technology. Thus, in one example, the WTRU 1202 may include two or more transmit/receive elements 1222 (e.g. multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as NR and IEEE 802.11, for example.

The processor 1218 of the WTRU 1202 may be coupled to, and may receive user input data from, the speaker/microphone 1224, the keypad 1226, and/or the display/touchpad 1228 (e.g. a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other examples, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 1218 may also be coupled to the GPS chipset 1236, which may be configured to provide location information (e.g. longitude and latitude) regarding the current location of the WTRU 1202. In addition to, or in lieu of, the information from the GPS chipset 1236, the WTRU 1202 may receive location information over the air interface 1216 from a base station (e.g. base stations 1214*a*, 1214*b*) and/or determine its location based on the timing of the signals being received from two or more nearby base stations. It will be appreciated that the WTRU 1202 may acquire location information by way of any suitable location-determination method while remaining consistent with an example.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1238 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 1202 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 1218). In an example, the WRTU 1202 may include a half-duplex radio for which transmission and reception of some or all of the signals (e.g. associated with particular subframes for either the UL (e.g. for transmission) or the downlink (e.g. for reception))

Figure 6C:
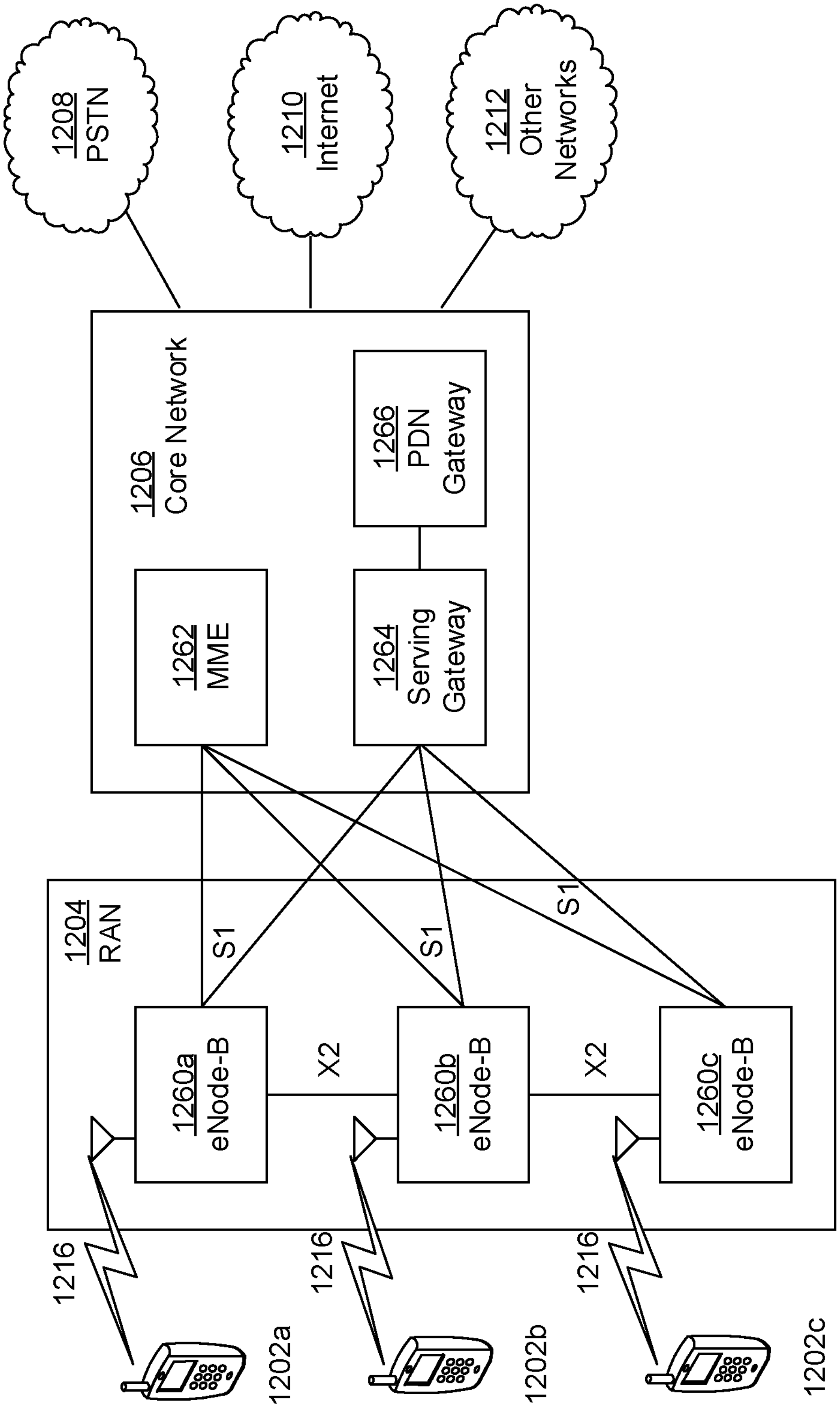
FIG. 6C is a system diagram illustrating an example radio access network (RAN) and an example core network (CN) that may be used within the communications system illustrated in FIG. 6A according to an example.

FIG. 6C is a system diagram illustrating the RAN 1204 and the CN 1206 according to an example. As noted above, the RAN 1204 may employ an E-UTRA radio technology to communicate with the WTRUs 1202*a*, 1202*b*, 1202*c* over the air interface 1216. The RAN 1204 may also be in communication with the CN 1206.

The RAN 1204 may include eNode-Bs 1260*a*, 1260*b*, 1260*c*, though it will be appreciated that the RAN 1204 may include any number of eNode-Bs while remaining consistent with an example. The eNode-Bs 1260*a*, 1260*b*, 1260*c* may each include one or more transceivers for communicating with the WTRUs 1202*a*, 1202*b*, 1202*c* over the air interface 1216. In one example, the eNode-Bs 1260*a*, 1260*b*, 1260*c* may implement MIMO technology. Thus, the eNode-B 1260*a*, for example, may use multiple antennas to transmit wireless signals to, and/or receive wireless signals from, the WTRU 1202*a*.

Each of the eNode-Bs 1260*a*, 1260*b*, 1260*c* may be associated with a particular cell (not shown) and may be configured to handle radio resource management decisions, handover decisions, scheduling of users in the UL and/or DL, and the like. As shown in FIG. 6C, the eNode-Bs 1260*a*, 1260*b*, 1260*c* may communicate with one another over an X2 interface.

The CN 1206 shown in FIG. 6C may include a mobility management entity (MME) 1262, a serving gateway (SGW) 1264, and a packet data network (PDN) gateway (or PGW) 1266. While each of the foregoing elements are depicted as part of the CN 1206, it will be appreciated that any of these elements may be owned and/or operated by an entity other than the CN operator.

The MME 1262 may be connected to each of the eNode-Bs 1260*a*, 1260*b*, 1260*c* in the RAN 1204 via an S1 interface and may serve as a control node. For example, the MME 1262 may be responsible for authenticating users of the WTRUs 1202*a*, 1202*b*, 1202*c*, bearer activation/deactivation, selecting a particular serving gateway during an initial attach of the WTRUs 1202*a*, 1202*b*, 1202*c*, and the like. The MME 1262 may provide a control plane function for switching between the RAN 1204 and other RANs (not shown) that employ other radio technologies, such as GSM and/or WCDMA.

The SGW 1264 may be connected to each of the eNode Bs 1260*a*, 1260*b*, 1260*c* in the RAN 1204 via the S1 interface. The SGW 1264 may generally route and forward user data packets to/from the WTRUs 1202*a*, 1202*b*, 1202*c*. The SGW 1264 may perform other functions, such as anchoring user planes during inter-eNode B handovers, triggering paging when DL data is available for the WTRUs 1202*a*, 1202*b*, 1202*c*, managing and storing contexts of the WTRUs 1202*a*, 1202*b*, 1202*c*, and the like.

The SGW 1264 may be connected to the PGW 1266, which may provide the WTRUs 1202*a*, 1202*b*, 1202*c* with access to packet-switched networks, such as the Internet 1210, to facilitate communications between the WTRUs 1202*a*, 1202*b*, 1202*c* and IP-enabled devices.

The CN 1206 may facilitate communications with other networks. For example, the CN 1206 may provide the WTRUs 1202*a*, 1202*b*, 1202*c* with access to circuit-switched networks, such as the PSTN 1208, to facilitate communications between the WTRUs 1202*a*, 1202*b*, 1202*c* and traditional land-line communications devices. For example, the CN 1206 may include, or may communicate with, an IP gateway (e.g. an IP multimedia subsystem (IMS) server) that serves as an interface between the CN 1206 and the PSTN 1208. In addition, the CN 1206 may provide the WTRUs 1202*a*, 1202*b*, 1202*c* with access to the other networks 1212, which may include other wired and/or wireless networks that are owned and/or operated by other service providers Although the WTRU is described in FIGS. 6A-6D as a wireless terminal, it is contemplated that in certain representative examples that such a terminal may use (e.g. temporarily or permanently) wired communication interfaces with the communication network.

In representative examples, the other network 1212 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative examples, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative examples, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative example, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 6D:
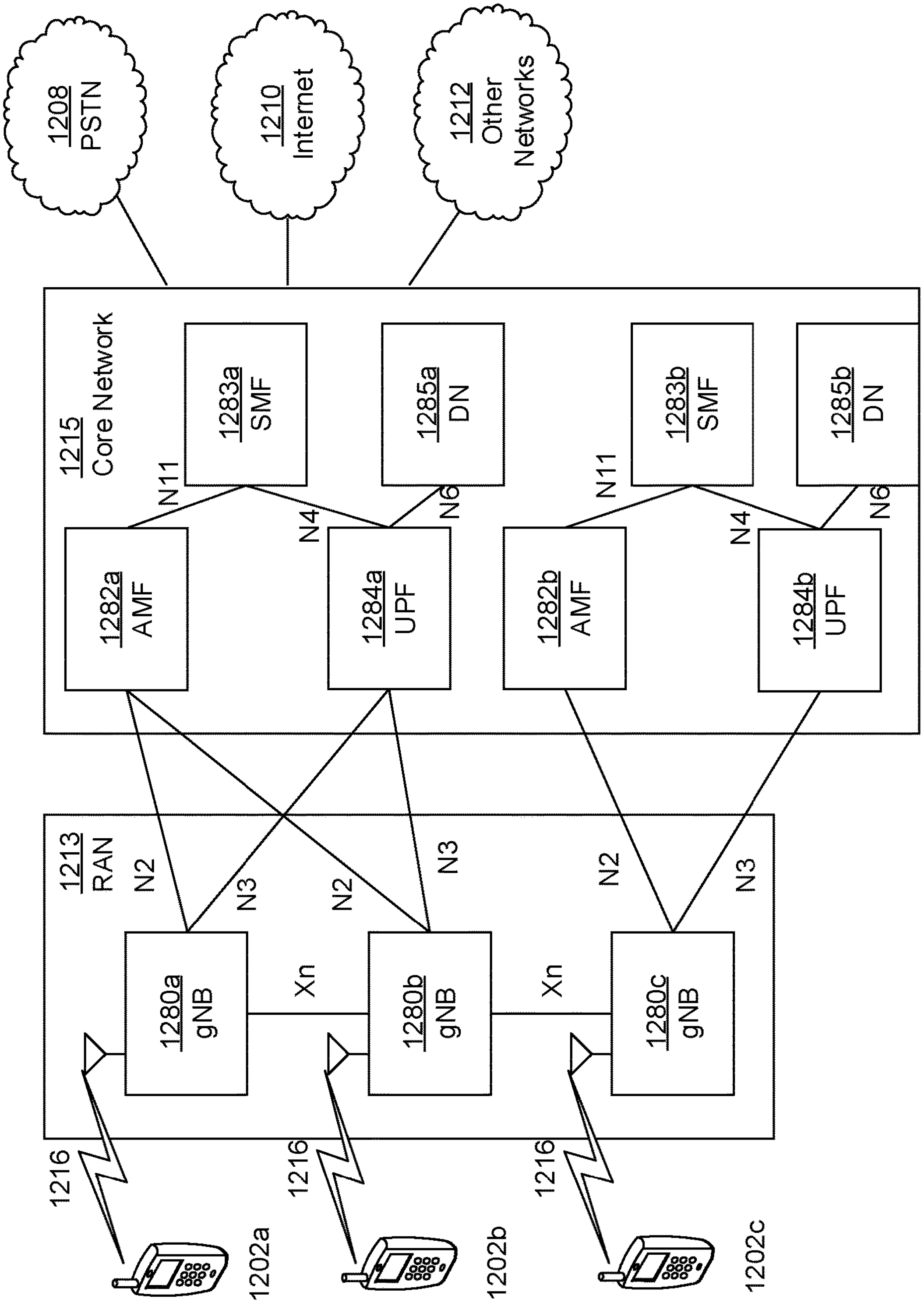
FIG. 6D is a system diagram illustrating a further example RAN and a further example CN that may be used within the communications system illustrated in FIG. 6A according to an example.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 6D is a system diagram illustrating the RAN 1213 and the CN 1215 according to an example. As noted above, the RAN 1213 may employ an NR radio technology to communicate with the WTRUs 1202*a*, 1202*b*, 1202*c* over the air interface 1216. The RAN 1213 may also be in communication with the CN 1215.

The RAN 1213 may include gNBs 1280*a*, 1280*b*, 1280*c*, though it will be appreciated that the RAN 1213 may include any number of gNBs while remaining consistent with an example. The gNBs 1280*a*, 1280*b*, 1280*c* may each include one or more transceivers for communicating with the WTRUs 1202*a*, 1202*b*, 1202*c* over the air interface 1216. In one example, the gNBs 1280*a*, 1280*b*, 1280*c* may implement MIMO technology. For example, gNBs 1280*a*, 1280*b* may utilize beamforming to transmit signals to and/or receive signals from the gNBs 1280*a*, 1280*b*, 1280*c*. Thus, the gNB 1280*a*, for example, may use multiple antennas to transmit wireless signals to, and/or receive wireless signals from, the WTRU 1202*a*. In an example, the gNBs 1280*a*, 1280*b*, 1280*c* may implement carrier aggregation technology. For example, the gNB 1280*a* may transmit multiple component carriers to the WTRU 1202*a* (not shown). A subset of these component carriers may be on unlicensed spectrum while the remaining component carriers may be on licensed spectrum. In an example, the gNBs 1280*a*, 1280*b*, 1280*c* may implement Coordinated Multi-Point (CoMP) technology. For example, WTRU 1202*a* may receive coordinated transmissions from gNB 1280*a* and gNB 1280*b* (and/or gNB 1280*c*).

The WTRUs 1202*a*, 1202*b*, 1202*c* may communicate with gNBs 1280*a*, 1280*b*, 1280*c* using transmissions associated with a scalable numerology. For example, the OFDM symbol spacing and/or OFDM subcarrier spacing may vary for different transmissions, different cells, and/or different portions of the wireless transmission spectrum. The WTRUs 1202*a*, 1202*b*, 1202*c* may communicate with gNBs 1280*a*, 1280*b*, 1280*c* using subframe or transmission time intervals (TTIs) of various or scalable lengths (e.g. containing varying number of OFDM symbols and/or lasting varying lengths of absolute time).

The gNBs 1280*a*, 1280*b*, 1280*c* may be configured to communicate with the WTRUs 1202*a*, 1202*b*, 1202*c* in a standalone configuration and/or a non-standalone configuration. In the standalone configuration, WTRUs 1202*a*, 1202*b*, 1202*c* may communicate with gNBs 1280*a*, 1280*b*, 1280*c* without also accessing other RANs (e.g. such as eNode-Bs 1260*a*, 1260*b*, 1260*c*). In the standalone configuration, WTRUs 1202*a*, 1202*b*, 1202*c* may utilize one or more of gNBs 1280*a*, 1280*b*, 1280*c* as a mobility anchor point. In the standalone configuration, WTRUs 1202*a*, 1202*b*, 1202*c* may communicate with gNBs 1280*a*, 1280*b*, 1280*c* using signals in an unlicensed band. In a non-standalone configuration WTRUs 1202*a*, 1202*b*, 1202*c* may communicate with/connect to gNBs 1280*a*, 1280*b*, 1280*c* while also communicating with/connecting to another RAN such as eNode-Bs 1260*a*, 1260*b*, 1260*c*. For example, WTRUs 1202*a*, 1202*b*, 1202*c* may implement DC principles to communicate with one or more gNBs 1280*a*, 1280*b*, 1280*c* and one or more eNode-Bs 1260*a*, 1260*b*, 1260*c* substantially simultaneously. In the non-standalone configuration, eNode-Bs 1260*a*, 1260*b*, 1260*c* may serve as a mobility anchor for WTRUs 1202*a*, 1202*b*, 1202*c* and gNBs 1280*a*, 1280*b*, 1280*c* may provide additional coverage and/or throughput for servicing WTRUs 1202*a*, 1202*b*, 1202*c*.

Each of the gNBs 1280*a*, 1280*b*, 1280*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 1284*a*, 1284*b*, routing of control plane information towards Access and Mobility Management Function (AMF) 1282*a*, 1282*b* and the like. As shown in FIG. 6D, the gNBs 1280*a*, 1280*b*, 1280*c* may communicate with one another over an Xn interface.

The CN 1215 shown in FIG. 6D may include at least one AMF 1282*a*, 1282*b*, at least one UPF 1284*a*,1284*b*, at least one Session Management Function (SMF) 1283*a*, 1283*b*, and possibly a Data Network (DN) 1285*a*, 1285*b*. While each of the foregoing elements are depicted as part of the CN 1215, it will be appreciated that any of these elements may be owned and/or operated by an entity other than the CN operator.

The AMF 1282*a*, 1282*b* may be connected to one or more of the gNBs 1280*a*, 1280*b*, 1280*c* in the RAN 1213 via an N2 interface and may serve as a control node. For example, the AMF 1282*a*, 1282*b* may be responsible for authenticating users of the WTRUs 1202*a*, 1202*b*, 1202*c*, support for network slicing (e.g. handling of different PDU sessions with different requirements), selecting a particular SMF 1283*a*, 1283*b*, management of the registration area, termination of NAS signaling, mobility management, and the like. Network slicing may be used by the AMF 1282*a*, 1282*b* in order to customize CN support for WTRUs 1202*a*, 1202*b*, 1202*c* based on the types of services being utilized WTRUs 1202*a*, 1202*b*, 1202*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 1282 may provide a control plane function for switching between the RAN 1213 and other RANs (not shown) that employ other radio technologies, such as LTE, LTE-A, LTE-A Pro, and/or non-3GPP access technologies such as WiFi.

The SMF 1283*a*, 1283*b* may be connected to an AMF 1282*a*, 1282*b* in the CN 1215 via an N11 interface. The SMF 1283*a*, 1283*b* may also be connected to a UPF 1284*a*, 1284*b* in the CN 1215 via an N4 interface. The SMF 1283*a*, 1283*b* may select and control the UPF 1284*a*, 1284*b* and configure the routing of traffic through the UPF 1284*a*, 1284*b*. The SMF 1283*a*, 1283*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 1284*a*, 1284*b* may be connected to one or more of the gNBs 1280*a*, 1280*b*, 1280*c* in the RAN 1213 via an N3 interface, which may provide the WTRUs 1202*a*, 1202*b*, 1202*c* with access to packet-switched networks, such as the Internet 1210, to facilitate communications between the WTRUs 1202*a*, 1202*b*, 1202*c* and IP-enabled devices. The UPF 1284, 1284*b* may perform other functions, such as routing and forwarding packets, enforcing user plane policies, supporting multi-homed PDU sessions, handling user plane QoS, buffering downlink packets, providing mobility anchoring, and the like.

The CN 1215 may facilitate communications with other networks. For example, the CN 1215 may include, or may communicate with, an IP gateway (e.g. an IP multimedia subsystem (IMS) server) that serves as an interface between the CN 1215 and the PSTN 1208. In addition, the CN 1215 may provide the WTRUs 1202*a*, 1202*b*, 1202*c* with access to the other networks 1212, which may include other wired and/or wireless networks that are owned and/or operated by other service providers. In one example, the WTRUs 1202*a*, 1202*b*, 1202*c* may be connected to a local Data Network (DN) 1285*a*, 1285*b* through the UPF 1284*a*, 1284*b* via the N3 interface to the UPF 1284*a*, 1284*b* and an N6 interface between the UPF 1284*a*, 1284*b* and the DN 1285*a*, 1285*b*.

In view of FIGS. 6A-6D, and the corresponding description of FIGS. 6A-6D, one or more, or all, of the functions described herein with regard to one or more of: WTRU 1202*a-d*, Base Station 1214*a-b*, eNode-B 1260*a-c*, MME 1262, SGW 1264, PGW 1266, gNB 1280*a-c*, AMF 1282*a-b*, UPF 1284*a-b*, SMF 1283*a-b*, DN 1285*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An apparatus for video decoding, comprising one or more processors, wherein the one or more processors are configured to:
- obtain video data, wherein the video data comprises prediction residuals of a coding block;
- determine, based on the video data, that the prediction residuals are obtained using a triangular partition mode or a geometric merge mode; and
- based on the determination that the prediction residuals of the coding block are obtained using the triangular partition mode or the geometric merge mode, decode the prediction residuals of the coding block with multiple transform selection (MTS) disabled.

2. The apparatus of claim 1, wherein the one or more processors being configured to decode the prediction residuals of the coding block with MTS disabled comprises the one or more processors being configured to skip obtaining an MTS index from the video data.

3. The apparatus of claim 1, wherein the one or more processors are further configured to determine, based on the video data, that the prediction residuals are obtained with transform skip disabled, and to decode the prediction residuals of the coding block with transform skip disabled.

4. The apparatus of claim 1, wherein the one or more processors being configured to decode the prediction residuals of the coding block with MTS disabled comprises the one or more processors being configured to apply a discrete cosine transform to the coding block.

5. A method for video decoding, comprising:
- obtaining video data, wherein the video data comprises prediction residuals of a coding block;
- determining, based on the video data, that the prediction residuals are obtained using a triangular partition mode or a geometric merge mode; and
- in response to determining that the prediction residuals of the coding block are obtained using the triangular partition mode or the geometric merge mode, decoding the prediction residuals of the coding block with multiple transform selection (MTS) disabled.

6. The method of claim 5, wherein decoding the prediction residuals of the coding block with MTS disabled comprises skipping obtaining an MTS index from the video data.

7. The method of claim 5, further comprising determining, based on the video data, that the prediction residuals are obtained with transform skip disabled, wherein the decoding of the prediction residuals of the coding block is performed with transform skip disabled.

8. The method of claim 5, wherein decoding the prediction residuals of the coding block with MTS disabled comprises applying a discrete cosine transform to the coding block.

9. An apparatus for video encoding, comprising one or more processors, wherein the one or more processors are configured to:
- determine prediction residuals of a coding block using an inter-prediction technique; and
- on a condition that the inter-prediction technique is a triangular partition mode or a geometric merge mode:
  - disable multiple transform selection (MTS) for the prediction residuals of the coding block; and
  - encode the prediction residuals of the coding block with MTS disabled.

10. The apparatus of claim 9, wherein the one or more processors being configured to disable MTS for the prediction residuals of the coding block comprises the one or more processors being configured to skip performance of a rate distortion search based on one or more candidate transforms for the coding block.

11. The apparatus of claim 9, wherein, on a condition that the inter-prediction technique is an affine motion compensation mode, a combined inter and intra prediction mode, the triangular partition mode, or the geometric merge mode, the one or more processors are further configured to determine that transform skip is to be disabled for the prediction residuals of the coding block, and to disable transform skip for the prediction residuals of the coding block.

12. The apparatus of claim 9, wherein the one or more processors are further configured to encode the prediction residuals of the coding block with MTS enabled based on a determination that the inter-prediction technique is not a combined inter and intra prediction mode, an affine motion compensation mode, the triangular partition mode, or the geometric merge mode.

13. The apparatus of claim 9, wherein, on the condition that the inter-prediction technique is the triangular partition mode or the geometric merge mode, the one or more processors are further configured to not encode an MTS index for the coding block.

* * * * *